July 21, 1953 G. GORHAM 2,646,337

RECORDER WITH RETRACTABLE WEB-SUPPORTING MEANS

Filed June 21, 1949 4 Sheets-Sheet 1

INVENTOR.
GEORGE GORHAM
BY Edwin Levisohn &
Harry Cohen
ATTORNEYS

July 21, 1953 G. GORHAM 2,646,337

RECORDER WITH RETRACTABLE WEB-SUPPORTING MEANS

Filed June 21, 1949 4 Sheets-Sheet 2

INVENTOR.
GEORGE GORHAM

BY Edwin Levisohn & Harry Cohen

ATTORNEYS

July 21, 1953 G. GORHAM 2,646,337

RECORDER WITH RETRACTABLE WEB-SUPPORTING MEANS

Filed June 21, 1949 4 Sheets-Sheet 3

INVENTOR.
GEORGE GORHAM

BY Edwin Levisohn + Harry Cohen

ATTORNEYS

July 21, 1953 G. GORHAM 2,646,337

RECORDER WITH RETRACTABLE WEB-SUPPORTING MEANS

Filed June 21, 1949 4 Sheets-Sheet 4

INVENTOR.
GEORGE GORHAM

BY Edwin Levisohn + Harry Cohen

ATTORNEYS

Patented July 21, 1953

2,646,337

UNITED STATES PATENT OFFICE 2,646,337

RECORDER WITH RETRACTABLE WEB-SUPPORTING MEANS

George Gorham, New York, N. Y., assignor to Technicon Cardiograph Corporation, New York, N. Y., a corporation Application June 21, 1949, Serial No. 100,449

15 Claims. (Cl. 346—145)

This invention relates to recorders and more particularly to improved means for feeding or moving the chart paper or record web in relation to the marking element or elements of the recorder.

This application is a continuation-in-part of my application Ser. No. 788,801, filed November 29, 1947, and which issued on October 3, 1950, as Patent No. 2,524,564.

While useful for other purposes, the present invention was developed primarily for direct writing electro-cardiographs such as that shown, for example, in my application Ser. No. 762,613, filed July 22, 1947, wherein a multiple-lead direct writing electro-cardiograph recorder is disclosed and claimed. The device of the present invention is therefore shown in conjunction with a plurality of marking elements, but it will be understood that the same device may be used in conjunction with a single marking element, and it will be understood further than said device may be used in various recorders other than electro-cardiograph recorders wherein a record is made on a moving web of paper or other suitable sheet material.

One object of the present invention is the provision of improved means for supporting and feeding the record web in relation to the marking element.

Another object is to provide a record-web feeding device which is of such construction as to facilitate the insertion of the web in the device for operation by the latter for moving the web on its support at the recording station.

A further object is to provide a record-web feeding device wherein provision is made to eliminate curls formed in the web whereby the web, with the recording thereon, is delivered from the recorder in a substantially flat condition.

The above and other objects, features and advantages of the present invention will be fully understood from the following description with reference to the accompanying drawings which, however, are to be considered as illustrative of the invention, in its presently preferred form, but not in limitation thereof.

Figure 9:
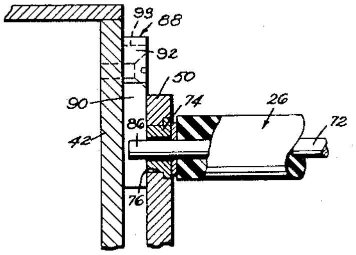
Figure 10:
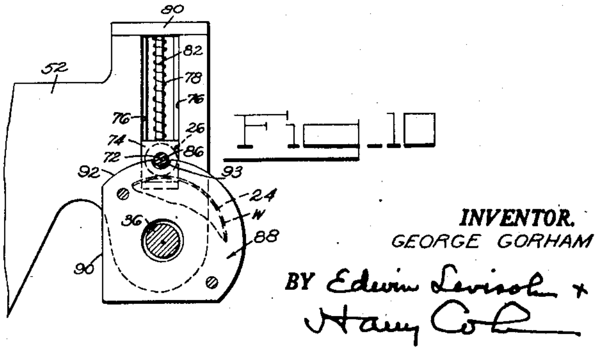
Figure 2:
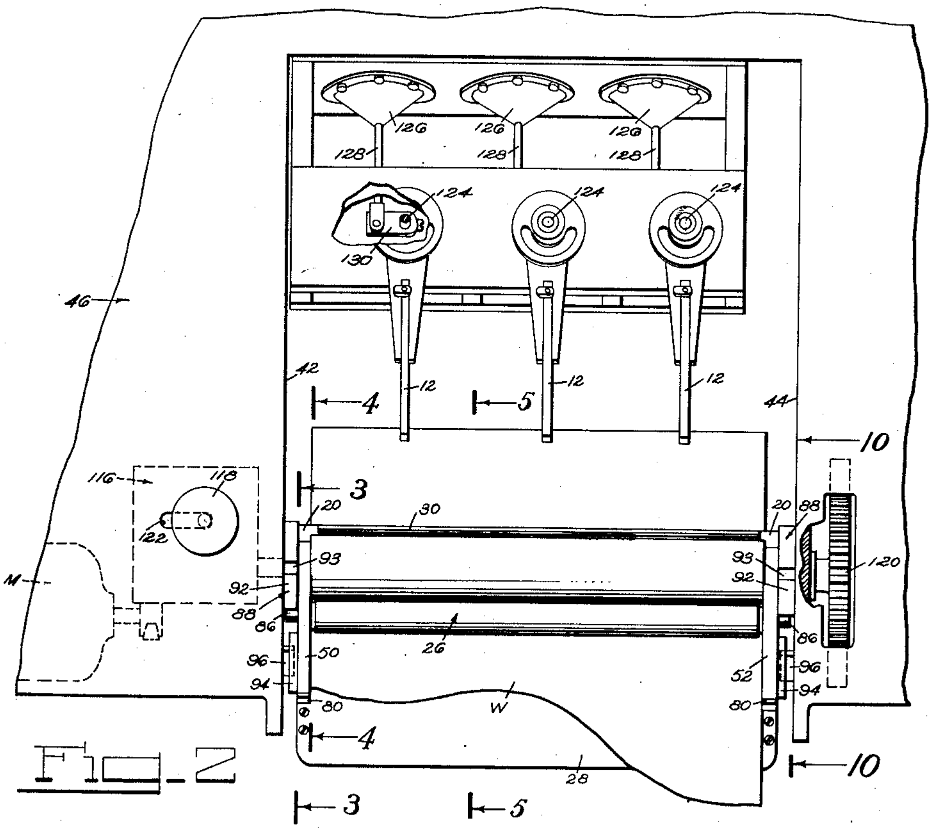
Fig. 2 is a plan view of part of said recorder provided with said device.
Figure 4:
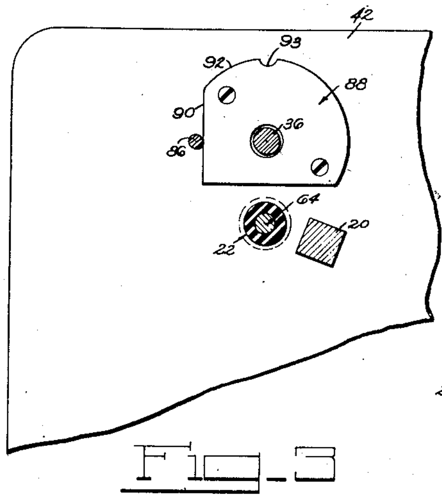
Figure 3:
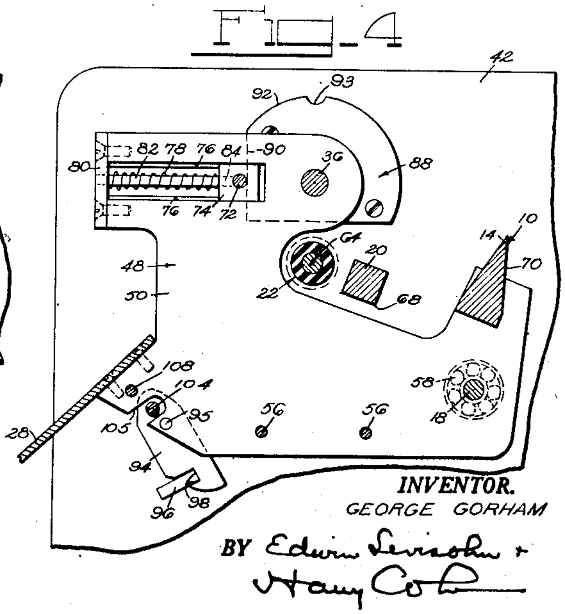
Figures 5, 6:
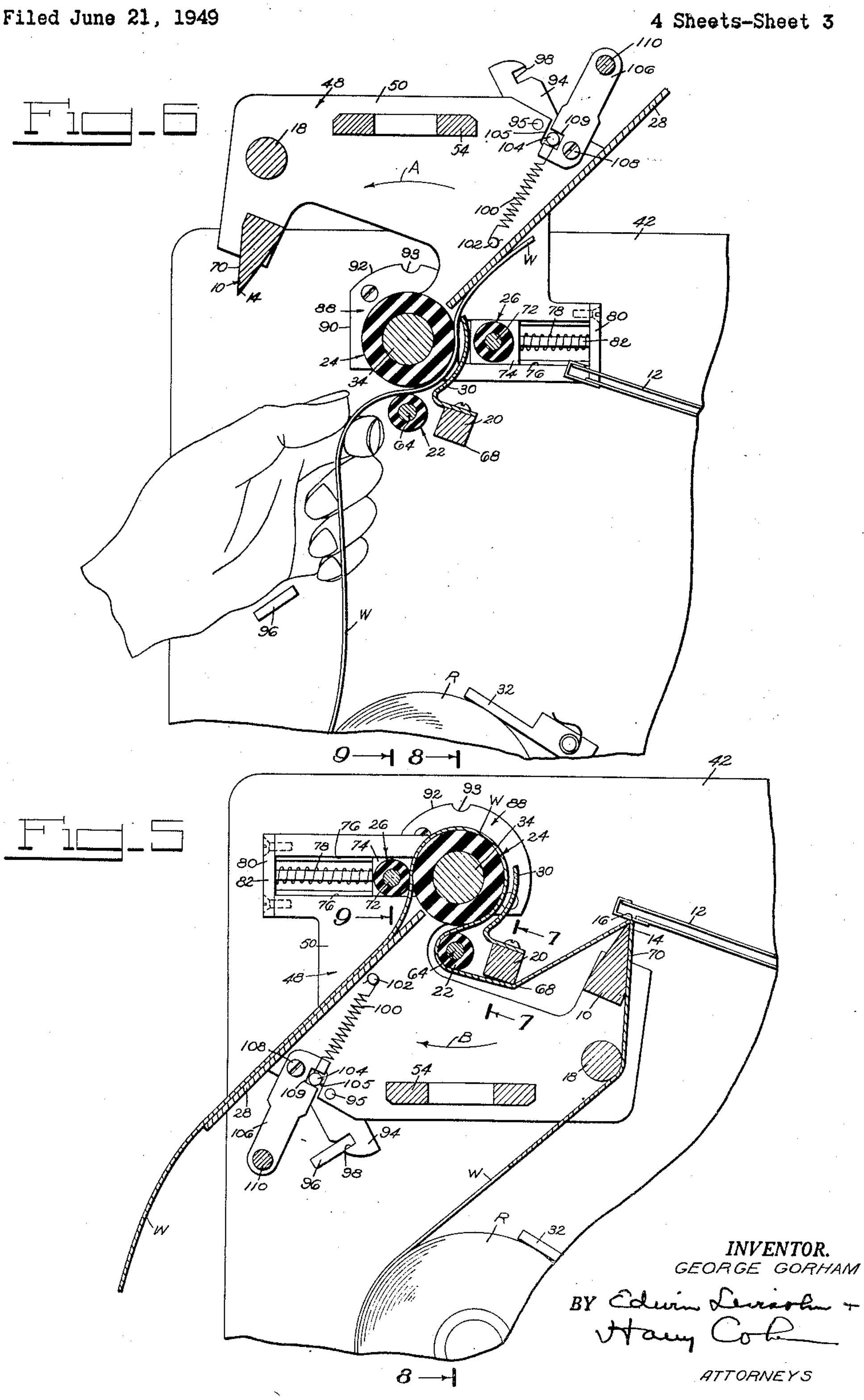
Figure 7:
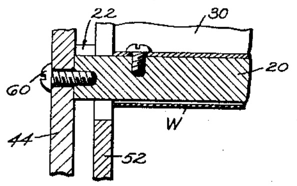
Figure 8:
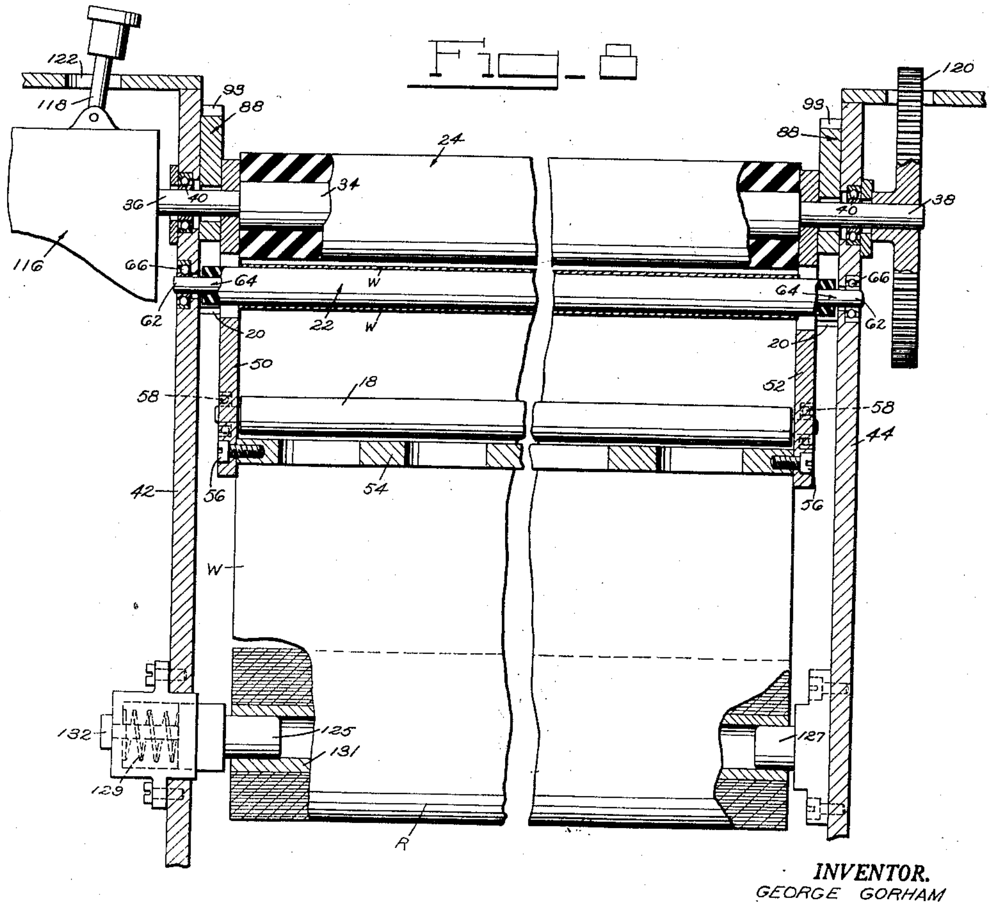

Figs. 3 and 4 are sectional views on the lines 3—3 and 4—4, respectively, of Fig. 2;

Fig. 5 is a sectional view on the line 5—5 of Fig. 2;

Fig. 6 is a view similar to Fig. 5 but in a different position of the related parts;

Fig. 7 is a sectional view on the line 7—7 of Fig. 5, portions being omitted for the purpose of illustration;

Fig. 8 is a sectional view on the line 8—8 of Fig. 5;

Fig. 9 is a sectional view on the line 9—9 of Fig. 5;

Fig. 10 is a sectional view on the line 10—10 of Fig. 2, but with certain parts in different relative positions.

In the preferred embodiment of the invention, the support 10 for the record-web W, at the web-marking station where the web is marked by one or more marking elements 12 (see Figs. 1, 2 and 5) is in the form of a bar having a narrow edge 14, as described in my above mentioned application, Ser. No. 762,613. The web is caused to move in the direction of its length and is directed in its travel over said edge 14 of support 10 so as to form a fold line 16 at said edge longitudinally of said edge and transversely of the web, whereby a very narrow or line-like portion of the web is presented to the marking elements 12 at each instant during the travel of the web from the supply roll R in the operation of the recorder. If desired, provision may be made for pre-heating the web before it is acted upon by the marking elements 12, as shown, for example, in my application Ser. No. 74,668, filed February 4, 1949. Preferably, as here shown (Fig. 5), a guide roller 18 is provided for directing the web in this folded relation to edge 14 of web-support 10 from whence the web travels across and slidably engages an under-part of guide-bar 20, as will hereinafter more fully appear. From guide-bar 20 the web passes over a roller 22 which directs it over the driven feed roller 24, the web then passing between the latter and the companion pressure roller 26. An inclined plate 28 is provided forwardly of rollers 24 and 26 for directing the web for delivery to a suitable receptacle (not shown).

Web support 10 and rollers 18 and 26 are mounted for unitary turning movement about the axis of driven roller 24 to and from the web-feed or operative positions shown in Fig. 5 and, concomitantly, from and to the position shown in Fig. 6. In the latter position, the web support 10 is retracted and rollers 22, 24, 26 and plate 28 are relatively positioned for the insertion of the web into a passage-way defined between rollers 22 and 24 and between plate 28 and roller 26. A web guide-plate 30 carried by guide-bar 20 is provided to guide the leading end of the web around roller 24 and between plate 28 and roller 26 after said end of the web is inserted between rollers 22 and 24 in the position of the parts shown in Fig. 6. It will be noted that rollers 22 and 26 are spaced from roller 24, in the positions shown in Fig. 6, thus allowing the web to move freely therebetween.

After the web W is thus inserted between rollers 22 and 24 and between plate 28 and roller 26, the unit is moved forwardly, i. e., in the direction of arrow A (Fig. 6) to an intermediate position of the unit at which roller 26 engages web W and presses the web against roller 24 (Fig. 10). In this position of the unit, roller 24, when turned by hand, as hereinafter described, may be operated to feed the desired length of web through rollers 22 and 24 and between rollers 24 and 26. Thereafter, the unit is moved in the same direction to its position shown in Fig. 5, and during that movement roller 26 is moved away from roller 24, roller 26 being maintained in spaced relation to roller 24 until the unit is in its operative position shown in Fig. 5, wherein roller 26 again presses the web W against roller 24. In the course of the movement of the unit from the position shown in Fig. 6 to the position shown in Fig. 5, support 10 and guide roller 18 engage the web W and dispose the latter as shown in Fig. 5, a sufficient length of the web being drawn from the supply roll R. A spring-pressed plate 32 is provided as a friction drag on roll R for tensioning the web.

The means provided for accomplishing the above described operations and functions will now be described in detail. The driven feed roller 24 is carried by a rotary shaft 34 (Fig. 8) provided with reduced end portions 36 and 38 which are journalled for rotation in bearings 40 carried by the spaced parts 42 and 44 of the frame 46 of the recorder. Guide roller 18, roller 26, plate 28 and web support 10 are carried by a movable frame 48 which includes the opposite side plates 50 and 52 turnably mounted on the ends 36 and 38 of the driven feed roller shaft 34 relatively thereto. A cross member 54 is connected at its opposite ends in any suitable way, as by screws 56 to said side plates 50 and 52 for holding the latter in fixed spaced relation. The opposite ends of web support 10 are secured to said frame plates 50 and 52, and the opposite ends of guide roller 18 are mounted in said side plates in anti-friction bearings 58 as indicated in Fig. 4.

Guide-bar 20 is preferably square in cross-section and is mounted at its opposite ends in the frame parts 42 and 44 of the frame 46 by screws 60 (Fig. 7), or by other suitable means, to prevent rotation thereof. Roller 22 is also mounted in said frame parts, the ends 62 of the spindle 64 of the roller being journalled for rotation in anti-friction bearings 66 carried by said frame parts (Fig. 8). It will be noted from Figs. 3, 4, 5 and 6 that roller 22 is positioned in frame 46, slightly above and forwardly of guide-bar 20, the latter being disposed so that its lowest extremity is the corner edge 68. The web W, in travelling upwardly from the supply roll R over 18 and along side 70 of support 10 to the narrow edge 14 to form fold-line 16 and then downwardly to roller 22, tends to become curled and would normally remain in said curled condition when delivered from plate 28. However, in its downward travel from edge 14, the web slidably engages corner edge 68 of guide-bar 20 from whence it moves upwardly to roller 22, which directs it over roller 24, and due to said engagement any tendency of the web to curl by reason of its engagement by edge 14 of support 10 is obviated.

Roller 26, which normally co-acts with driven roller 24 in moving the record web W during the operation of the recorder, is carried by frame 48 and is movable toward and away from roller 24 automatically by movement of said frame. The spindle 72 of roller 26 is mounted at its opposite ends in blocks 74 which are slidably movable in the guides 76 integral with or carried by frame plates 50 and 52. Said blocks 74 are biased by springs 78 for movement toward roller 24, the opposite ends of each spring bearing on the companion block 74 and the end plate 80 of the companion guide 76. A stationary centering pin 82 is provided in each guide 76 for the companion spring, block 74 having a hole 84 (Fig. 4) to provide for movement of said block longitudinally of said pin, and the outer end of said pin being fixed to end plate 80. Spindle 72 projects through the companion guide blocks 74 and terminates in outer end portions 86 which engage the stationary cams 88 which are carried by stationary frame parts 42 and 44. It will be noted that cams 88 are positioned with reference to the turning axis of roller 24, which is the turning axis of frame 48. Referring to Figs. 5 and 6 in conjunction with Fig. 3, it will be understood that when frame 48 is turned in the direction of the arrow B from the position shown in Fig. 5 to the position shown in Fig. 6, the ends 86 of the spindle 72 of roller 26 move upwardly along the vertical cam edges 90 and thereby move blocks 74, against the pressure of springs 78, to move roller 26 away from roller 24. Continued movement of frame 48 in the same direction causes spindle ends 86 to ride on the curved edges 92 of the companion cams 88, respectively, until the frame is in its fully retracted position shown in Fig. 6 wherein roller 26 is spaced from roller 24, guide plate 30 being positioned between said rollers. A notch 93 is provided in the edge of each cam 88 in which the spindle ends 86 are releasably engageable for holding the frame 48 releasably in the intermediate position in which roller 26 is in pressure-applying relation to roll 24 (Fig. 10). Thus, notches 93 in conjunction with spindle ends 86 provide means for releasably holding the frame in a position in which rollers 24 and 26 may be manually turned for feeding the web, roller 24 being disconnected from its driving means as subsequently described. It will be apparent that with frame 48 in the position illustrated in Fig. 6, the leading end of the web W may be inserted between the spaced rollers 22 and 24, and urged upwardly until it projects beyond guide plate 30, and, as said frame is moved to the intermediate position, roller 26 engages the projected portion of the web which is then pressed against roller 24 by roller 26 in the intermediate position (Fig. 10) thereby providing for the manual feed and positioning of the web as roller 24 is manually turned.

Provision is made for releasably locking frame 48 in the operative position thereof. For this purpose, a latching or locking member or lever 94 is pivotally mounted on frame plate 50 at 95 for releasable engagement with a catch 96 carried by part 42 of the main stationary frame. Movable locking member 94 is provided with a notch 98 in which catch 96 is engaged when movable frame 48 is in operative position as shown in Fig.

Figure 1:
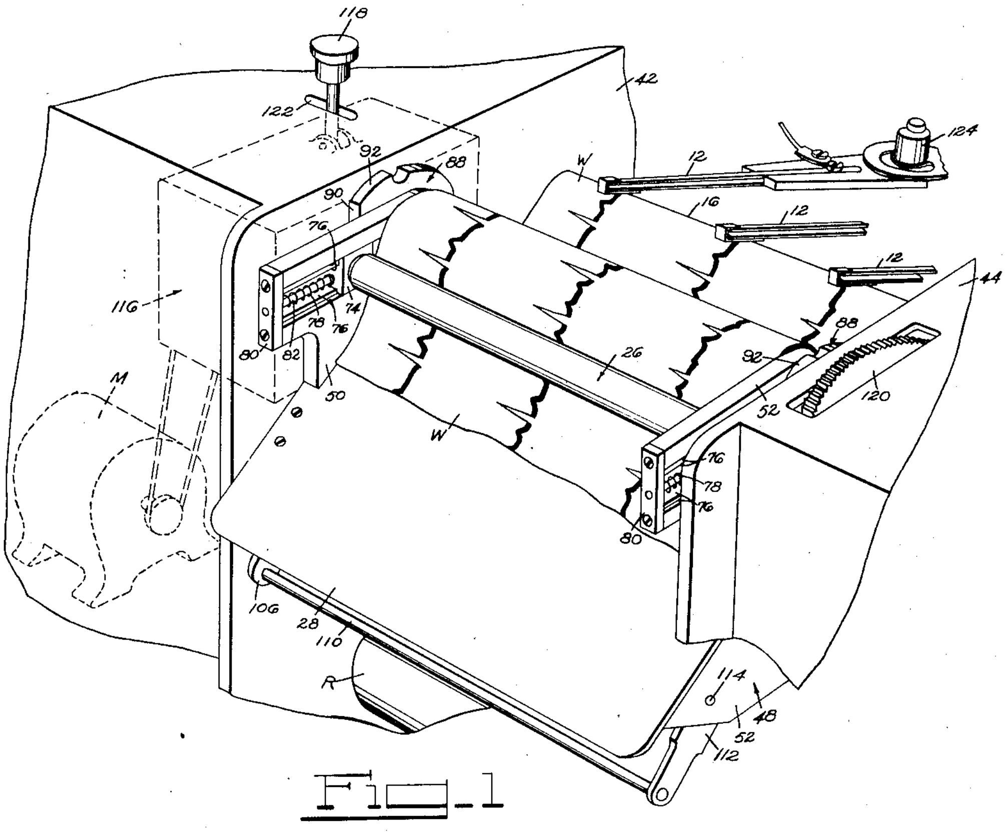
Fig. 1 is a perspective view of part of a recorder provided with a device embodying the present invention, parts being broken away for the purpose of illustration.

5. Member 94 is held releasably in engagement with catch 96 by a spring 100 which is secured at one end to frame part 50 by the pin 102 and at its opposite end to member 94 by pin 104 carried by the latter. The means for releasing frame-locking member 94 from catch 96, whereby to release frame 48 from frame 46 for movement, comprises an arm 106 which is pivotally mounted on movable frame part 50 by the pivot screw 108. Said arm 106 has a notch 109 in which pin 104 of locking member 94 is engaged. When it is desired to unlock frame 48 from stationary frame 46, arm 106 is moved clockwise, viewing Fig. 5, whereby to move member 94 out of engagement with catch 96. Releasing member 106 is conveniently operable by a bar or rod 110 which is connected at one end thereof to the outer end of member 106. The opposite end of rod 110 is connected to the outer end of an arm 112 which is pivotally connected to frame part 52 by the pivot screw 114. As shown in Fig. 1, bar 110 is conveniently located below plate 28 of frame 48 so that when it is desired to move said frame to its retracted position, this may be done by raising bar 110 whereby to unlock the frame, and by continuing to move said bar in the same direction engaging the same with the underside of frame plate 28 and moving the latter to the position shown in Fig. 6. When the frame 48 is returned to its normal or operative position (Fig. 5) locking member 94 automatically engages catch 96 and releasably locks said frame in said position. Frame 48 has an edge recess 105 for pin 104.

The main feed roller 24 is driven at a uniform rate by a motor M which is operatively connected to the shaft of said roller. Preferably a clutch and variable gear-ratio transmission indicated more or less schematically at 116 is provided so that roller 24 may be driven at a selected speed. A gear shift lever 118 is provided for changing the gear ratio and for disengaging the transmission from the roller shaft 36. It will be understood that the variable gear and clutch mechanism may be of any suitable type and need not be described since such mechanisms are well known and do not per se form part of the present invention. However, it may be noted that I prefer to use a change-speed and clutch mechanism having provision for operating roller 24 at two different uniform speeds one of which is twice the other. In Fig. 1, lever 118 is shown in its neutral position, the shaft of roller 24 being de-clutched and therefore free to be turned manually by the hand wheel 120 which is fixed to the end portion 38 of said shaft. Said hand wheel 120 may be used to operate roller 24 for adjusting the web W preliminary to the operation of the recorder. In the position of lever 118 shown in Fig. 8, the shaft of roller 24 is operatively connected to the transmission gears for operation at the normal speed, and when the lever 118 is moved to its opposite position adjacent the opposite end of the guide slot 122 the shaft of roller 24 is operatively connected for operation at twice the normal speed. It will be understood that the gear transmission mechanism 116 may have provision for more than two speeds.

The means and mechanisms for actuating the marking elements 12 are preferably of the construction shown and claimed in my above mentioned application, Ser. No. 762,613, but may be of any other suitable construction, and therefore need not be specifically described herein. It may be noted, however, that elements 12 are oscillated by their respective spindles 124, in accordance with variations which are to be recorded, laterally of the web. As shown in Fig. 2, each spindle 124 is actuated by a member 126 which is connected by a rod 128 to a crank arm 130 fixed to the spindle 124. Members 126 are operated by the driving coils of an electro-magnetic device which operates in accordance with the variations to be recorded.

The supply roll R of the record web or chart paper is removably mounted for rotation on stationary cylindrical supports 125 and 127 carried by parts 42 and 44, respectively, of the recorder frame 46. Support 125 is spring projected by the spring 129 of a known device and may be retracted to facilitate mounting the roll R in position. It will be readily understood that when one roll R is depleted, the core of spool 131 may be easily removed by retracting the support 125 by the retracting pin 132. It will be understood, of course, that the means for mounting roll R for rotation to pay out the web, as the latter is drawn therefrom by the feed roller 24 and its companion pressure roller 26, may be of any other suitable construction. The roll R may be readily inserted in position through the front of the machine, as is apparent from the drawings and the description.

Various changes in the details of construction and in the arrangement of parts may be made in the device of the present invention without departing from the underlying idea and principles within the scope of the appended claims.

Having thus described my invention, what I claim and desire to secure by Letters Patent, is:

1. In a recorder provided with means for marking a record on a web of sheet material, means including a driven feed roller and a companion pressure roller for moving said web in the direction of its length in relation to said marking means, a frame mounted for turning movement about the axis of said feed roller, means carried by said frame and having an edge for supporting the web for the action thereon of said marking means when said frame is in a predetermined position thereof, said frame being movable about said axis to a retracted position to facilitate the insertion of the leading end of the web between said feed roller and said pressure roller, a stationary web-guide mounted independently of said frame, and a companion web-guide carried by and movable with said frame, said web-guides being disposed so as to be positioned below and at opposite sides of said edge of said web supporting means, when said frame is in said predetermined position, for directing the web upwardly to and downwardly from said edge during the travel of said web over said edge, said independently mounted web-guide being retained against rotation and having a marginal edge portion in frictional engagement with said web whereby the latter is delivered from said recorder in substantially flat condition.

2. In a recorder provided with means for marking a record on a web of sheet material and with means for moving said web in the direction of its length in relation to said marking means; a tapered-bar support for the web having an edge over which the web travels and which extends transversely of the web in juxtaposition to said marking means, and a movable frame carrying said support and movable from a normal position in which said support is positioned between said marking means and said web-moving means for supporting the web to a retracted position in which the web support is clear of and completely separated from the web, and a pair of web guides constructed and arranged to direct the web so that portions thereof which are at opposite sides of said edge diverge downwardly from said edge during the travel of the web, said web guides being relatively movable and one of said guides being movable with said frame to release and clear the web when the frame is moved to said retracted position thereof, the other of said guides being retained against rotation for frictionally engaging the web in said normal position for delivering the latter from said recorder in substantially flat condition.

3. In a recorder provided with means for marking a record on a web of sheet material, a stationary frame, a driven feed roll mounted in said frame for rotation for moving the web in the direction of its length, a movable frame mounted for turning movement about the axis of said feed roll, a web support carried by said movable frame, and a pressure roller carried by said movable frame for rotation about an axis parallel to the axis of the feed roll, said web support and said pressure roller being movable about said axis of the feed roll from an operative position, in which said pressure roller cooperates with said feed roll to move the web in the direction of its length and in which the support positions the web in operative relation to said marking means, to a retracted position in which said pressure roller is spaced from said feed roll in parallel relation thereto to facilitate the insertion of the leading end of the web between said feed and pressure rolls, and means positioned in relation to said feed roll and said marking means to automatically engage the web in the operative position of said web support, said automatically engaging means being in relatively movable relation to the web during the movement thereof in the recording operation whereby any tendency of the web to curl by reason of its engagement with said web support is obviated.

4. In a recorder provided with means for marking a record on a web of sheet material, a stationary frame, a driven feed roll mounted in said frame for rotation for moving the web in the direction of its length, a movable frame mounted for turning movement about the axis of said feed roll, a web support carried by said movable frame, and a pressure roller carried by said movable frame for rotation about an axis parallel to the axis of the feed roll, said web support and said pressure roller being movable about said axis of the feed roll from an operative position in which said pressure roller cooperates with said feed roll to move the web in the direction of its length and in which the support positions the web in operative relation to said marking means, to a retracted position in which said pressure roller is spaced from said feed roll in parallel relation thereto to facilitate the insertion of the leading end of the web between said feed and pressure rolls, and means carried by said stationary frame and positioned in relation to said feed roll and said marking means to automatically engage the web in the operative position of said web support, said automatically engaging means being in relatively movable relation to the web during the movement thereof in the recording operation whereby any tendency of the web to curl by reason of its engagement with said web support is obviated.

5. In a recorder provided with means for marking a record on a web of sheet material, a stationary frame, a driven feed roll mounted in said frame for rotation for moving the web in the direction of its length, a movable frame mounted for turning movement about the axis of said feed roll, a web support carried by said movable frame, and a pressure roller carried by said movable frame for rotation about an axis parallel to the axis of the feed roll, said web support and said pressure roller being movable about said axis of the feed roll from an operative position, in which said pressure roller cooperates with said feed roll to move the web in the direction of its length and in which the support positions the web in operative relation to said marking means, to a retracted position in which said pressure roller is spaced from said feed roll in parallel relation thereto to facilitate the insertion of the leading end of the web between said feed and pressure rolls, and means positioned in relation to said feed roll and said marking means to automatically engage the web in the operative position of said web support, said automatically engaging means being in relatively movable relation to the web during the movement thereof in the recording operation whereby any tendency of the web to curl by reason of its engagement with said web support is obviated, said automatically engageable means and said web support engaging opposite surfaces, respectively, of the web.

6. In a recorder provided with means including a feed roll and a companion pressure roller for feeding a web in the direction of its length and with means for marking a record on the web during said movement of the latter, a frame carrying said feed roll for rotation about an axis transversely of the web feed, a movable web support mounted for movement about said axis of the feed roll concentrically therewith, said web support being swingably movable about said axis from an operative position, in which it supports the web rearwardly of the feed roll in operative relation to said marking means, to a retracted position forwardly of said feed roll to facilitate the insertion of the leading end of the web between said feed roll and said companion pressure roller, and means positioned on said frame in relation to said feed roll and said marking means to automatically engage the web in the operative position of said web support, said automatically engaging means being in relatively movable relation to the web during the movement thereof in the recording operation whereby any tendency of the web to curl by reason of its engagement with said web support is obviated.

7. In a recorder provided with means including a feed roll and a companion pressure roller for feeding a web in the direction of its length and with means for marking a record on the web during said movement of the latter, a frame carrying said feed roll for rotation about an axis transversely of the web feed, a movable web support mounted for movement about said axis of the feed roll concentrically therewith, said web support being swingably movable about said axis from an operative position, in which it supports the web rearwardly of the feed roll in operative relation to said marking means, to a retracted position forwardly of said feed roll to facilitate the insertion of the leading end of the web between said feed roll and said companion pressure roller, and guide means on said frame disposed adjacent to said feed roll for defining a web passageway therewith and for guiding the web directly from said web support, in the operative position of the latter, through said passageway for movement between said feed roll and said companion pressure roller.

8. In a recorder provided with means including a feed roll and a companion pressure roller for feeding a web in the direction of its length and with means for marking a record on the web during said movement of the latter, a frame carrying said feed roll for rotation about an axis transversely of the web feed, a movable web support mounted for movement about said axis of the feed roll concentrically therewith, said web support being swingably movable about said axis from an operative position, in which it supports the web rearwardly of the feed roll in operative relation to said marking means, to a retracted position forwardly of said feed roll to facilitate the insertion of the leading end of the web between said feed roll and said companion pressure roller, and guide means on said frame disposed adjacent to said feed roll for defining a web passageway therewith and for guiding the web directly from said web support, in the operative position of the latter, through said passageway for movement between said feed roll and said companion pressure roller, said guide means including anti-web curling means positioned to be slidably engaged by the web between said web support and said passageway.

9. In a recorder provided with means including a feed roll and a companion pressure roller for feeding a web in the direction of its length and with means for marking a record on the web during said movement of the latter, a frame carrying said feed roll for rotation about an axis transversely of the web feed, a movable web support mounted for movement about said axis of the feed roll concentrically therewith, said web support being swingably movable about said axis from an operative position, in which it supports the web rearwardly of the feed roll in operative relation to said marking means, to a retracted position forwardly of said feed roll to facilitate the insertion of the leading end of the web between said feed roll and said companion pressure roller, and guide means on said frame disposed adjacent to said feed roll for defining a web passageway therewith and for guiding the web directly from said web support, in the operative position of the latter, through said passageway for movement between said feed roll and said companion pressure roller, said guide means including anti-web curling means positioned to be slidably engaged by the web between said web support and said passageway and a guide roller positioned to direct the web to said feed roll from said anti-web curling means.

10. In a recorder for marking a record on a web of sheet material wherein the web moves over a web support to a feed roller, means for obviating the tendency of the web to curl by reason of its engagement with said web support comprising a non-rotatable guide member positioned to engage the web in relatively movable relation thereto as it moves from said support.

11. In a recorder for marking a record on a web of sheet material wherein the web moves over a web support to a feed roller, means for obviating the tendency of the web to curl by reason of its engagement with said web support comprising a guide member positioned to engage the web in relatively movable relation thereto as it moves from said support, said member having an angular portion disposed to frictionally engage the surface of the web opposite the surface thereof which passes over said support.

12. In a recorder provided with means for marking a record on a web of sheet material and with means for moving said web from a supply source in the direction of its length in relation to said marking means; a support for the web having an edge over which the web travels from said source and which extends transversely of the web in juxtaposition to said marking means, a movable frame carrying said support and movable from a normal position in which said support is positioned between said web-moving means and both said supply source and marking means for supporting the web to a retracted position in which the web support is clear of and completely separated from the web, and a pair of web guides constructed and arranged to direct the web so that portions thereof which are at opposite sides of said edge diverge downwardly from said edge during the travel of the web, said web guides being relatively movable and one of said guides being movable with said frame to release and clear the web when the frame is moved to said retracted position thereof, in which position the web extends directly from said source to said web-moving means for the automatic realignment of the web with said one guide, said support and said marking means on the return of the frame to its normal position, the other of said web guides being a stationary bar mounted between said web-moving means and said marking means and disposed to frictionally engage said web in said normal position for delivering said web from said recorder in a substantially flat condition.

13. In a recorder provided with means for marking a record on a web of sheet material, means including a driven feed roll and a companion pressure roller for moving said web in the direction of its length in relation to said marking means, a frame mounted for turning movement about the axis of said feed roll, means carried by said frame and having an edge for supporting the web for the action thereon of said marking means when said frame is in a predetermined position thereof, said frame being movable about said axis to retracted positions to facilitate the insertion of the leading end of the web between said feed roll and said pressure roller and to adjust said web in guided position between said feed roll and said pressure roller, a web-guide mounted independently of said frame, and a companion web-guide carried by and movable with said frame, said web-guides being disposed so as to be positioned below and at opposite sides of said edge of said web supporting means, when said frame is in said predetermined position, for directing the web upwardly to and downwardly from said edge during the travel of said web over said edge, said independently mounted web-guide being retained against rotation and having an angular portion in frictional engagement with the web in said predetermined position for delivering said web from said recorder in a substantially flat condition.

14. In a recorder provided with means for marking a record on a web of sheet material and with means for moving said web from a supply source in the direction of its length in relation to said marking means; a support for the web having an edge over which the web travels from said source and which extends transversely of the web in juxtaposition to said marking means, and a pair of web guides constructed and arranged to direct the web so that portions thereof which are at opposite sides of said edge diverge downwardly from said edge during the travel of the web, one of said web guides being a stationary bar mounted between said web-moving means and said marking means and disposed to frictionally engage said web for delivering said web from said recorder in a substantially flat condition.

15. In a recorder provided with means for marking a record on a web of sheet material and with means for moving said web from a supply source in the direction of its length in relation to said marking means; a support for the web having an edge over which the web travels from said source and which extends transversely of the web in juxtaposition to said marking means, and a pair of web guides disposed so as to be positioned below and at opposite sides of said edge of said web supporting means for directing the web upwardly to and downwardly from said edge during the travel of said web over said edge, one of said web-guides being retained against rotation and being in frictional engagement with the web for delivering said web from said recorder in a substantially flat condition.

GEORGE GORHAM.

References Cited in the file of this patent

UNITED STATES PATENTS

| Number | Name | Date |
|---|---|---|
| 1,927,899 | Mylus et al. | Sept. 26, 1933 |
| 2,070,505 | Beck | Feb. 9, 1937 |
| 2,074,118 | Ross et al. | Mar. 16, 1937 |
| 2,412,639 | Traugott | Dec. 17, 1946 |
| 2,540,081 | Alden | Feb. 6, 1951 |